Sept. 29, 1942.    A. KRÜSSMANN    2,297,481
ELECTRICALLY OPERATED DEVICE FOR TRANSMITTING ANGULAR MOVEMENT
Filed Oct. 3, 1940    2 Sheets—Sheet 1
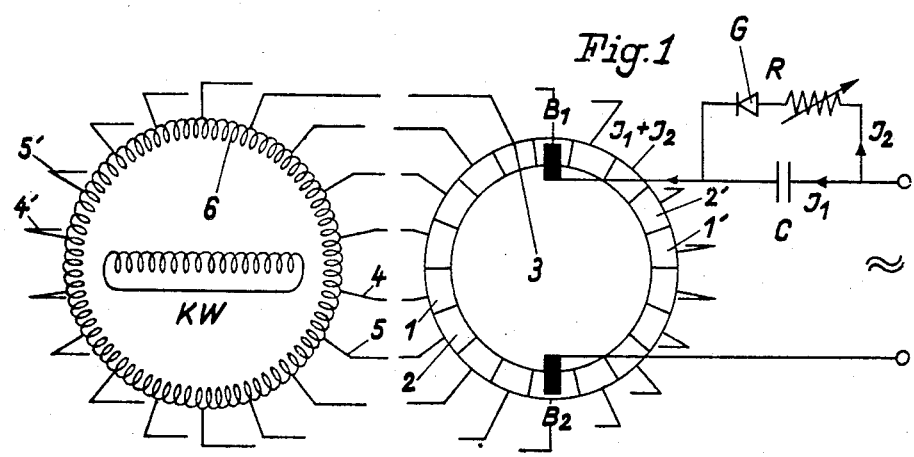
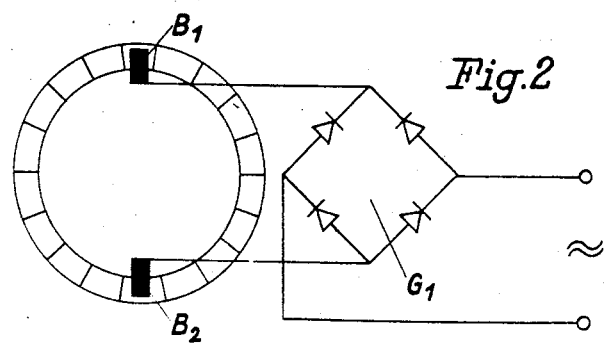
Inventor:
A. Krussmann
By A.D.Adams
Attorney Patented Sept. 29, 1942

2,297,481

UNITED STATES PATENT OFFICE 2,297,481

ELECTRICALLY OPERATED DEVICE FOR TRANSMITTING ANGULAR MOVEMENT

Adolf Krüssmann, Berlin-Wilmersdorf, Germany; vested in the Alien Property Custodian Application October 3, 1940, Serial No. 359,621
In Germany October 6, 1939

4 Claims. (Cl. 172—239)

The invention relates to an improvement in an electrically operated device for transmitting angular movement in which the transmitter consists in a commutator which has rotatable brushes and to whose conducting segments the taps of the rotary field winding of a receiver motor are connected. In such a system a rotary magnetic flux is created in the rotary field winding of the receiver motor which rotates synchronously with the rotary commutator brushes and causes a follow-up movement of the rotor of the receiver.

In the following the invention is explained in greater detail with reference to the drawings, of which:

Fig. 1 represents a complete wiring diagram of the transmitter and the receiver for transmitting angular movement according to the invention.

Fig. 2 represents a modification of the transmitter according to Fig. 1.

Figure 3:
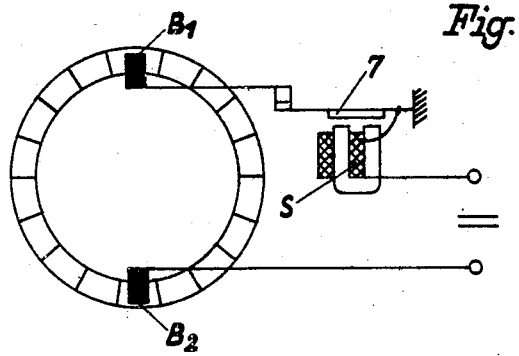
Fig. 3 represents another modified form of the transmitter according to Fig. 1.

In the arrangement according to Fig. 1 the transmitter is represented by a stationary commutator ring 3 having eighteen conducting segments insulated against each other. The diametrically arranged segments are designated by the numerals 1, 1', 2, 2' etc. Two A. C. fed brushes $B_1$, $B_2$, which are rotatably mounted and which slide diametrically on the commutator ring, are revolved in response to a primary movement. A receiver motor of the rotary field type has a stationary annular winding 6 which possesses eighteen taps corresponding to the number of the commutator segments, the taps being disposed at equal intervals over the annular winding. The diametrically arranged taps 4, 4', 5, 5' are connected to two diametrically opposed segments 1, 1', 2, 2', respectively, of the commutator ring. Thus an alternating current will flow from the brushes $B_1$, $B_2$ over two diametrically arranged commutator segments to two corresponding taps of the receiver winding 6 and then through the parallel-connected halves of the annular winding 6 thereby producing in the winding 6 an alternating magnetic field rotating corresponding to the rotation of the commutator brushes $B_1$, $B_2$. The rotor of the receiver motor carries a short circuited winding KW having a straight axis. If the relative position does not exist, an electromotive force is induced in the short circuited winding producing a current of considerable amount which produces a torque which is zero if the axes of the stator field and the winding KW are at right angles to one another; i. e., if the transmitter and the receiver are in the normal position to one another. Hence the rotor of the receiver follows the rotation of the brushes $B_1$ and $B_2$ under the influence of the torque produced by the short circuited winding KW. A condenser C is connected between one terminal of the A. C. power source and the brush $B_1$. A series connection of a variable resistance R and a rectifier G is connected parallel to the condenser C. This arrangement results in a superposition of the A. C. $I_1$ feeding the brushes $B_1$, $B_2$ and a D. C. $I_2$ controllable by the resistance R. Consequently when the brushes $B_1$, $B_2$ are rotating, on the one hand a rotary A. C. field is created in the rotary field winding corresponding in intensity to the A. C. field $I_1$, said field inducing the short circuited winding KW thereby exerting a torque upon it. On the other hand a rotary D. C. field is produced corresponding to the D. C. $I_2$. If the winding KW due to undesirable oscillations of the rotor moves from its desired position, this movement is effectively dampened by the D. C. field, because a velocity responsive electric power is induced in the winding KW. The D. C. field acts as an inductance brake, which becomes active only at deviations from the desired position of the rotor and otherwise does not hinder the rotor movement in any way, but even furthers it. As the current component $I_2$ flowing over the rectifier G is a pulsating D. C., this current also exerts an inducing influence on the short circuited winding KW thereby exerting a torque upon it.

It is also possible as shown in Fig. 2 to connect a full wave rectifier $G_1$ to the brushes $B_1$, $B_2$. In this case the brushes $B_1$, $B_2$ are fed only by a pulsating D. C. which of course possesses an A. C. component and a D. C. component and hence acts on the short circuit winding KW in the way referred to above.

In Fig. 3 the brushes $B_1$ and $B_2$ are connected to a D. C. source, the D. C. being continuously interrupted by means of an automatic interrupter S, shown as a magnetic hammer brake 7, and converted into pulsating D. C. This arrangement will be preferable if there is no A. C. source available for feeding the follow-up system.

Figure 4:
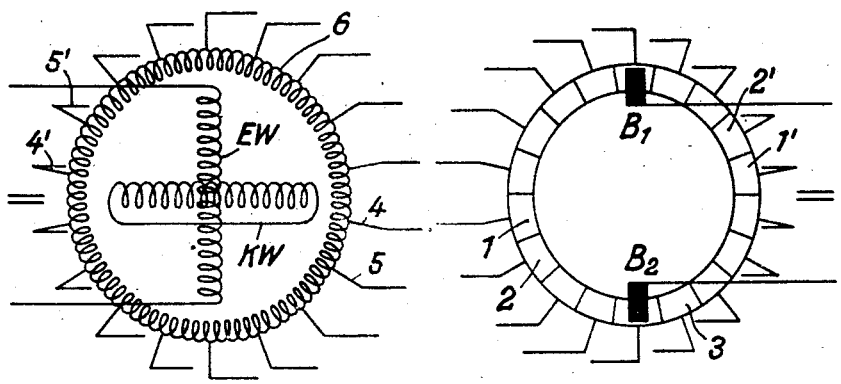
Fig. 4 shows a complete wiring diagram of a further modification of the device for transmitting angular movement according to the invention.

Fig. 4 shows a device for transmitting angular movement, said device being fed by a constant D. C. The rotor of the motor carries an exciting field winding EW and a short circuited winding KW, both windings having straight axes at right angles to each other; the winding EW is connected to the D. C. power source feeding the brushes B₁, B₂. If the brushes rotate in response to the angular movement to be transmitted, a constant unidirectional rotary magnetic field is produced in the rotary field winding 6 of the receiver motor which rotates synchronously with the commutator brushes and which tends to adjust the rotor winding EW into the direction of the rotary stator field. If the rotor oscillates about this relative position, an electromotive force is induced in the short circuited winding KW by the constant unidirectional stator field corresponding to the velocity at which the magnetic stator flux is intersected by the short circuited winding KW.

What I claim is:

1. An electrically operated device for transmitting angular movement comprising an annular commutator consisting of a plurality of conducting segments insulated against each other and of a plurality of rotatably mounted sliding brushes; said brushes being rotatable simultaneously in dependence on the angular movement to be transmitted; an electric motor having a stator carrying an annular rotary field winding; said winding having an number of circumferentially disposed taps connected to circumferentially disposed commutator segments; an A. C. power source and a D. C. power source; said commutator brushes being connected to said A. C. and said D. C. power source for producing in the stator of the motor an alternating magnetic field and a constant magnetic field, both fields rotating synchronously with the commutator brushes; and the rotor of the motor carrying a short circuited winding having a straight axis and tending to adjust that axis perpendicularly to the stator magnetic flux.

2. An electrically operated device for transmitting angular movement comprising an annular commutator consisting of a plurality of conducting segments insulated against each other and of a plurality of rotatably mounted sliding brushes; said brushes being rotatable simultaneously in dependence on the angular movement to be transmitted; an electric motor having a stator carrying an annular rotary field winding; said winding having a number of circumferentially disposed taps connected to circumferentially disposed commutator segments; a pulsating D. C. power source; said commutator brushes being connected to said power source for producing in the stator of the motor an alternating magnetic field corresponding to the A. C. component of the pulsating D. C. power source and for producing a constant magnetic field corresponding to the D. C. component of the pulsating D. C. power source; both magnetic stator fields rotating synchronously with the commutator brushes; and the rotor of the motor carrying a short circuited winding having a straight axis and tending to adjust that axis perpendicularly to the stator magnetic flux.

3. An electrically operated device for transmitting angular movement comprising an annular commutator consisting of a plurality of conducting segments insulated against each other and of a plurality of rotatably mounted sliding brushes; said brushes being rotatable simultaneously in dependence on the angular movement to be transmitted; an electric motor having a stator carrying an annular rotary field winding; said winding having a number of circumferentially disposed taps connected to circumferentially disposed commutator segments; an A. C. fed rectifier for delivering a pulsating D. C.; the output terminals of said rectifier being connected to said commutator brushes for producing in the stator of the motor an alternating magnetic field corresponding to the A. C. component of the pulsating D. C. delivered by the rectifier and for producing a constant magnetic field corresponding to the D. C. component of the pulsating D. C. delivered by the rectifier; both magnetic stator fields rotating synchronously with the commutator brushes; and the rotor of the motor carrying a short circuited winding having a straight axis and tending to adjust that axis perpendicularly to the stator magnetic flux.

4. An electrically operated device for transmitting angular movement comprising an annular movement comprising an annular commutator consisting of a plurality of conducting segments insulated against each other and of a plurality of rotatably mounted sliding brushes; said brushes being rotatable simultaneously in dependence on the angular movement to be transmitted; an electric motor having a stator carrying an annular rotary field winding; said winding having a number of circumferentially disposed taps connected to circumferentially disposed commutator segments; an A. C. power source and a capacity, both connected in series to said commutator brushes; a series connection of a rectifier and of a variable resistance connected parallel to said capacity for producing in the stator of the motor an alternating magnetic field and a constant magnetic field, both fields rotating synchronously with the commutator brushes; and the rotor of the motor carrying a short circuited winding having a straight axis and tending to adjust that axis perpendicularly to the stator magnetic flux.

ADOLF KRÜSSMANN.